Figure 1:
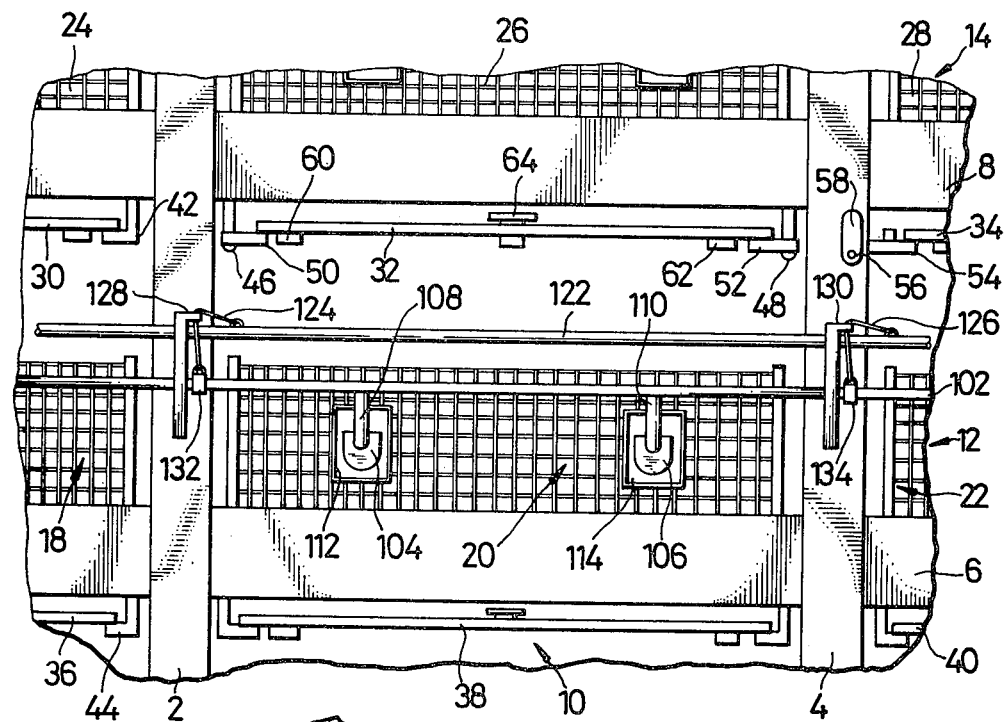

United States Patent [19]
Erfeling

[11] 3,952,703
[45] Apr. 27, 1976

[54] BATTERY-LIKE ARRANGEMENT OF CAGES FOR REARING AND TRANSPORTING POULTRY

[75] Inventor: Arthur Erfeling, Cuxhaven-Altenwalde, Germany

[73] Assignee: Lohmann Apparatebau GmbH, Altenwalder Chausse, Germany

[22] Filed: Feb. 3, 1975

[21] Appl. No.: 546,752

[30] Foreign Application Priority Data
Aug. 16, 1974   Germany............................ 2439368

[52] U.S. Cl.................................... 119/17; 119/18
[51] Int. Cl.² ........................................ A01K 31/00
[58] Field of Search .................... 119/18, 17, 21, 22

[56] References Cited
UNITED STATES PATENTS

| | | | |
|---|---|---|---|
| 1,347,397 | 7/1920 | Newman ............................... | 119/17 |
| 2,529,893 | 11/1950 | Albert ................................. | 119/18 X |
| 3,777,710 | 12/1973 | Rhinehart ............................ | 119/18 |
| 3,785,345 | 1/1974 | Rhinehart et al. ..................... | 119/18 |

*Primary Examiner*—Hugh R. Chamblee
*Attorney, Agent, or Firm*—Beaman & Beaman

[57] ABSTRACT

The invention pertains to a battery for raising poultry wherein the poultry are raised within a plurality of cage units having an open top closable by a separate cover supported on the battery frame above the cage to be enclosed during transport. The battery also employs feeding means movable between operative and inoperative positions for permitting cage unit displacement within the battery.

11 Claims, 4 Drawing Figures

BATTERY-LIKE ARRANGEMENT OF CAGES FOR REARING AND TRANSPORTING POULTRY

With known battery-like arrangements of cages the animals are kept in cage units usually composed of lattice grates, until they are ready to be slaughtered. The cage units are then taken out of the battery of cages together with the animals contained therein and transported to the slaughter house, where the animals are taken out of the cages and slaughtered; the cages are cleaned and occupied anew with young animals and transported again back into the battery of cages. It goes without saying that normally there are provided in the battery of cages automatic feeding, watering and waste removing systems in order to keep the work connected with maintaining and rearing the animals as low as possible. The requirement of utmost rationalization, of course, has to be met also in the transport and when slaughtering the animals, and is equally applicable to other devices which belong to the entire complex of rearing and slaughtering.

The present invention is based on the problem of further reducing the necessary expenses for rearing and slaughtering without affecting thereby the environmental conditions under which the animals have to live.

According to the invention this problem is solved with the aid of a battery-like arrangement of cages of the type mentioned at the beginning which is characterized in that the cage units within the battery of cages have open tops, a marginal height which is lower in comparison with the height provided for the animals to stay in the cage, said marginal height corresponding essentially to the height of cages for transport, and said cage units being adapted to be converted into closed cages for transport by fitting a cover thereat.

The invention avails itself of the knowledge that for the short space of time during which the transport takes place from the battery of cages to the slaughter house the height available to the animals may be considerably reduced without causing thereby any noticeable disadvantage.

With the battery of cages according to the invention it is thus obtained that the animals while being reared in the battery of cages have available to them the required height for their extended stay therein, however, when being transported to the slaughter house are pressed together more closely to occupy a smaller space of staying which is sufficient for transport purposes, without there being any need of transferring the animals into other cage units.

To simplify the fitting, removing and storing of the covers provision is made in a further suitable development of the invention for the arrangement of holding means in the upper regions of the storeys of the battery-like arrangement of cages to deposit there the covers which have been removed from the cage units. These holding means may be designed in different ways. It will be advantageous if the holding means are operable in common by groups and/or by machines and/or automatically. To provide for favourable prerequisites for the above, the holding means may be provided with pivotable tongues adapted to be pivoted beneath the covers which have been removed from the cages. The tongues are preferably provided at interlocking shafts operable from outside so that the covers disposed in the holding means may be conveniently and simply loosened.

In many instances it will suffice if the holding means are designed as guide rails for the covers provided at the undersides at the storeys. With this particularly simple embodiment the covers may conveniently be pushed onto the guide rails.

So that the animals may be safely kept in the cage units during transport, provision is made in a further embodiment of the invention for the cage units to have fastening means for the covers. So that the covers may be fitted and removed in a particularly convenient manner and within a short space of time, it will be recommendable for the fastening means to comprise arresting latches and latching means cooperating therewith, which will be provided at opposite edges of the cover of the cage and the cage upper portion, respectively.

In a further embodiment of the invention, provision is furthermore preferably made for lockable take-out openings to be provided in the covers, said take-out openings being preferably adapted to be closed by slides. This offers the advantage that one does not have to remove the covers not only during transport but neither in the slaughter house nor when taking out the animals or when cleaning and newly occupying the cage units so that during these operations the covers cannot be lost or damaged. In the slaughter house the animals are taken out through the opened take-out opening, and it is through these take-out openings that the cages may also be occupied anew with animals.

In a further embodiment of the invention, the object of the invention, i.e. the reduction of the overall expenses for rearing, transporting and slaughtering the animals, may be realized still better in a battery of cages according to the invention provided in the usual manner with supply means, particularly watering means extending along the storeys, by making arrangements for the supply means to comprise movable elements which are movable between a position of supply in which they make it possible for the animals staying in the cage units to take the material supplied to them, specifically liquids to be drunk, and a position of rest in which they do not obstruct the introduction of cage units into or the removal thereof from the storeys, respectively. Thus, with the introduction and removal of cage units there is no need for any connection work such as connecting pipelines, fitting hose ends and the like, but only the movable elements of the supply means are moved into their position of rest in which they are out of the path of movement of the cages. It is particularly to the purpose and has a particular labour saving effect if the movable elements comprise a supply pipe, in particular watering pipes, extending along several cage sites of a storey, said pipe having at least one outlet for each cage. It is then possible for the outlets of a whole row of cages to be moved out of the path of movement of the cage units in common by one single movement of the supply pipe. It goes without saying that there may be provided as well several pipes for the supply of different means of maintenance such as water, pasty feeds and the like.

The common movement of the outlets may be effected in particular in a simple manner safe in operation by providing for the supply pipe proper to be displaceable in a guide means between the position of supply and the position of rest; in this case the outlets may simply be rigidly connected with the supply pipe. To make use of gravity as an adjusting force it will be to the purpose to provide for the guide means to have a guide path with a vertical component of extension and for a pulling device for lifting and lowering the supply pipe against its own weight or due to its own weight, respectively. In this connection it will be to the purpose to design the pulling device in such a manner that it engages at the supply pipe in several places thereof longitudinally spaced along its length. In a further development of the invention a particularly simple embodiment thereof suited to this purpose and safe in operation is characterized in that the pulling device is provided with a draw-bar extending in parallel with the supply pipe and movable in the direction thereof said draw-bar having fastened thereat the ends of flexible pulling elements which are guided via deviation points fast with the stand and by the other ends thereof are fastened at the watering pipe with an approximately vertical direction of effectiveness. To avoid canting of the supply pipe it will be advantageous for the supply pipe to have a non-circular cross sectional area at least in the portions thereof disposed in the guide means which prevents the supply pipe from inadvertently rotating. In a further embodiment of the invention, the supply means are preferably designed in such a manner that they both afford the animals a convenient possiblity of supply and contribute to the fixation of the cages in the cage sites; for this purpose the outlets are provided at extensions branching from the supply pipe in places which when in the position of supply are disposed inside the respective inserted cage units and when in the position of rest are disposed outside them, with the cage units having corresponding passage openings.

Figure 4:
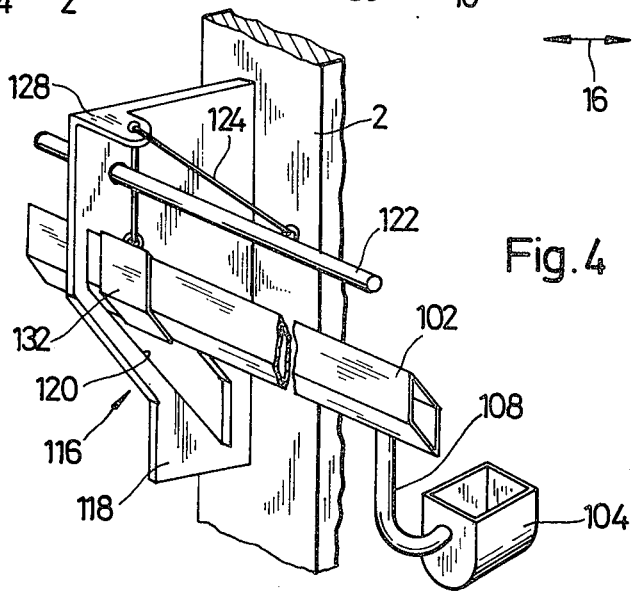
Figure 2:
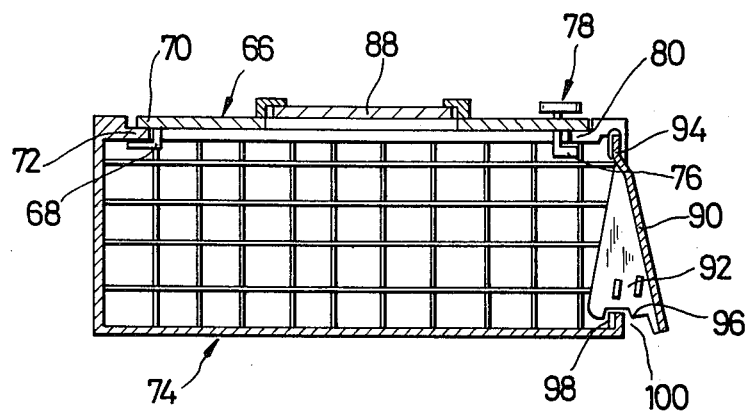
Figure 3:
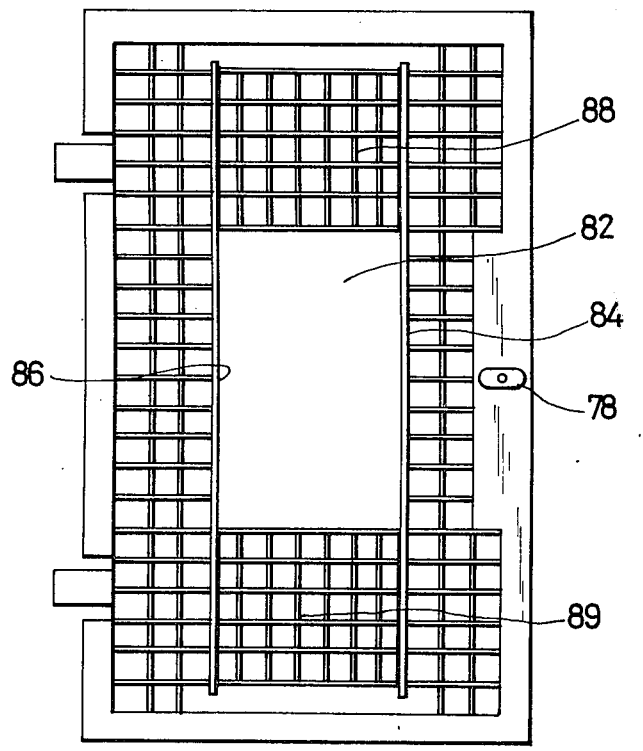

The invention will now be described in more detail by way of some examples of embodiment which are illustrated in the drawings. In the drawings, FIG. 1 is a sectional front view of a battery of cages according to the invention, FIG. 2 is a vertical sectional view of a cage unit of a modified embodiment of the invention, FIG. 3 is a schematic top plan view taken of a cage unit approximately corresponding to the embodiment shown in FIG. 3, and FIG. 4 is a schematic representation of a partial perspective view of a supply means suited for use with the battery of cages according to FIG. 1.

The battery of cages of which a schematic front sectional view is shown in FIG. 1 serves to rear poultry for fattening, particularly chickens to be fattened. It comprises a cage stand composed of vertical carriers and horizontal carriers, of which the vertical carriers 2 and 4 and the horizontal carriers 6 and 8 are shown in FIG. 1. The horizontal carriers subdivide the cage stand into several storeys, of which the three storeys 10, 12 and 14 are recognizable in FIG. 1. The storey 12 which is disposed between the horizontal carriers 6 and 8, same as is the case with the other storeys, comprises a row of cage units which are displaceable in the cage stand in the direction of the double arrow 16, the cage units 18, 20 and 22 thereof being recognizable in FIG. 1. Further cage units 24, 26, 28 are recognizable in the storey 14 disposed thereabove. In the figure of the drawing the cage units as represented are shown disposed at cage sites respectively disposed between two vertical carriers, and so the cage unit 20 for example is disposed between the vertical carriers 2 and 4. The devices for displacing the cage units are not shown in the drawing; the horizontal carriers 6, 8 may for instance be in the form of steel sections serving as slide or roller rails for the cage units. The space between the cage units mostly will be only narrow in the direction of the double arrow 16, and the individual cage units will often directly abut each other. In FIG. 1, a certain distance has been selected between the individual cage units for better clarity, and it may be imagined in this connection that perhaps buffers (not shown) may maintain these spaces between the individual cage units. Nor are there any devices shown by which the individual cages may be retained or arrested at their cage sites; in the most simple case this may involve deepenings in the slides or rails (not shown).

Each cage unit, that is the cage unit 20, for example, is composed of lattice grates like a box and has a standing or marginal height as is usual with transport cages, i.e. insufficient for the animals to stay permanently therein. Each cage unit is provided with a removable cover and, when the cage units are situated at the predetermined sites in the cage stand, the covers are removed so that the animals present in the cage units now have an increased height at their disposal for their stay in the cages, as essentially given by the height of the storeys or the distance between two horizontal carriers 6,8. When the animals are ready to be slaughtered, the covers are again placed onto the cage units, and the cage units are moved out of the cage stand and onto transport devices by which they are transported to the slaughter house. The cage units are thus adapted to be modified into closed transport cages by fitting or putting on the covers; in the cage stand, however, with the covers removed they fulfil the function of cages for the animals to stay in or rearing cages, the marginal height of the cages, of course, having to be sufficient to prevent the animals from escaping from the cage sites.

So that the covers which have been removed will not be lost and will at any time be handy to be put on again, with the battery of cages shown in FIG. 1 the cage covers 30,32,34,36,38,40 are fastened in the upper regions of the respective storeys by means of holding devices. Different forms which may be used for these holding means are illustrated in the Figure. With the cover 30 for the cage units 18 shown quite to the left at the top of FIG. 1 guide rails 42 in the form of angle sections are simply provided at the under side of the storey disposed thereabove, to be more exact, in this case at the underside of the horizontal carrier 8, into which the covers may be simply pushed. Also the storey disposed therebeneath is provided with guide rails 44 of the same type. The cover 32 of the cage 20 is retained by means of holding devices which are provided with tongues 50 and 52, respectively, adapted to be pivoted about vertical axes 46 and 48 into a position beneath the cover 32 which has been removed from the cage unit. With the cage unit 22 shown more to the right in the same storey 12 the pertaining cover 34 is likewise fastened at the bottom of the overlying storey by means of holding devices, with tongues 54 adapted to be pivoted there about horizontal interlocking shafts 56 by means of an adjusting lever 58. Arresting means (not shown) may be provided for the adjusting lever by which the tongues 54 are retained in the holding position as shown. The use of horizontal interlocking bars offers the advantage that several holding means (tongues 54) distributed over the depth of the storey may be actuated in common.

So as to be able to fasten the covers reliably at the cages in such a manner that the animals cannot break out during transport, the cage units are provided with fastening means for the covers. In FIG. 1 arresting latches and interlocking buttons are indicated only schematically for this purpose, for example, the arresting latches 60 and 62 and the interlocking button 64 at cover 32. The elements cooperating therewith at the lower portions of the cage units are not shown in FIG. 1.

FIG. 2 shows a schematic sectional side view of another embodiment of a cage unit taken along a plane normal to FIG. 1, in which an advantageous manner of fastening is illustrated in more detail which may be utilized for the covers. With this cage unit the cover 66 shown there is provided with an arresting tongue 68 at the longitudinal edge thereof which together with a protruding end section 70 of the rim of the cover forms a recess having the marginal portion 72 of the cage lower part 74 engaging therein. An interlocking member 76 is disposed at the other longitudinal edge of the cover which is rotatable with the interlocking button 78 and may be rotated into a snapped-in position beneath a rim portion 80 of the cage lower portion 74.

As is furthermore shown in FIGS. 2 and 3, there is a take-out opening 82 provided in the cover 66 shown there which is adapted to be closed by two slides 88, 90 running in guides 84, 86.

The embodiment of the cage unit shown in FIGS. 2 and 3 still differs from the cage units shown in FIG. 1 in that there are provided pivotable flaps 90 at the cage front sides having segmental walls 92 fitted at the ends thereof to extend in a direction normal thereto. The flaps 90 are pivotable about pivotal axes 94 and may be slightly displaced in height. Arresting grooves 96 are provided in the lower edge of the segmental walls 92 snappingly cooperating with a projection 98 of the bottom of the cage, so that the flap may be located in several hinged positions. Owing to this arrangement the animals kept in the cage unit 66 are given access through the gap 100 formed in this manner to the feeding devices (not shown) which are disposed therebeneath.

With the cage units shown in FIG. 1 supply means are provided extending along the cage units to provide for the animals. With the embodiment shown these supply means comprise a supply pipe 102 which serves to supply feed in a liquid condition or water and which may also serve as a watering pipe only as an addition to further supply means (not shown) for the supply of solid or semi-solid feed. For each cage site there are provided two outlets 104, 106 at the supply pipe 102 which with the embodiment shown are designed as watering basins. These outlets are fastened at the supply pipe via rigid extension pieces 108, 110 and with the supply means in the position of supply as shown in FIG. 1 enter into openings 112 and 114, respectively, in the cage side wall, so that the animals present in the cage unit may approach the outlets 104, 106.

As will be seen more exactly from FIG. 4, in particular, the supply pipe 102 has a non-circular cross sectional area and is displaceable in guide means 116 formed as slots in vertical extensions 118 of the vertical carrier 2 and 4 between the position of supply shown in FIG. 1 and the position of rest shown in FIG. 4. One will see that the guide 116 comprises a guiding path 120 extending with a vertical component, the extension of which is selected in such a manner that with a movement into the position of rest the extensions 104, 106 are moved out of the passage openings 112, 114 into positions in which they do not obstruct the movement of the cage units in the direction of the double arrow 16. It is obtained by the vertical component of the guiding path 120 that the movement in the one direction takes place under the effect of gravity. For the movement of the supply pipe 102, i.e. for the lifting and lowering thereof, there is provided a pulling device comprising a rod 122 which extends in parallel with the supply pipe and may be displaced in the direction thereof. This pulling rod has fastened thereto the ends of flexible tension elements 124, 126, preferably in the form of wire cables which are passed over deviation points 128, 130 fast with the stand and by the other ends thereof are fastened at the supply pipe 102 with the positive direction being approximately vertical; for this purpose there is a sleeve 132, 134 fastened at the supply pipe 102 in the respective positions thereof which serves also as a lateral guide. The points of deviation 128, 130 may operate using deviation rollers or may operate as shown, using simply deviation eyes which, of course, must secure a sufficiently large radius of deviation. Undesired rotary movements of the supply pipe 102 are prevented by the non-circular cross-sectional area thereof.

Other embodiments are possible without leaving the scope of the invention.

I claim:

1. A battery of cages for rearing and transporting poultry comprising, in combination, a battery frame including a plurality of vertical support columns, a plurality of vertically spaced horizontal carriers mounted upon said columns defining a plurality of stories, a plurality of separate cage units supported upon said carriers at predetermined positions, said cage units each having an open top and a marginal height less than the vertical spacing of said carriers and substantially corresponding to the transporting height of said cage units, a plurality of separate covers to selectively close said cage units open tops, and cover holding fittings defined on said battery frame adjacent each of said predetermined positions holding a cover vertically spaced above a cage unit open top whereby a cover may be readily placed upon a cage unit open top to close said cage units for transport.

2. In a battery of cages as in claim 1 wherein said holding fittings comprise movable means for supporting said covers directly above a cage unit.

3. In a battery of cages as in claim 2 wherein said holding means constitute pivotal tongues adapted to be pivoted beneath said covers for the support thereof.

4. In a battery of cages as in claim 3 wherein said tongues are provided with exteriorly operated operating shafts.

5. In a battery of cages as in claim 1 wherein said holding fittings comprise guide rails affixed to the undersides of said carriers.

6. In a battery of cages as in claim 1, fastening means defined on said covers for selectively attaching said covers to the open top of said cage units, said fastening means comprising arresting tongues and interlocking members cooperating with said cage unit adjacent said open ends at oppositely disposed edges of said covers.

7. A battery of cages as in claim 1, a closable takeout opening defined in each of said covers, a slide defined on each of said covers selectively movable thereon adapted to open and close said takeout openings.

8. In a battery of cages as in claim 1, a water supply conduit mounted upon said columns by conduit support means, said conduit support means including a guide means for moving said conduit between a poultry watering position and a cage displacement position, and operating means associated with said conduits for displacing said conduits between said positions.

9. A battery of cages as in claim 8 wherein said guide means is vertically disposed and obliquely related to said columns, and said operating means is adapted to raise said conduits within its associated guide means, and said conduits may lower in its associated guide means under the influence of gravity.

10. In a battery of cages as in claim 9 wherein said conduit operating means comprises a pull rod slidably mounted upon said columns and connected by a plurality of flexible pulling elements to a conduit whereby displacement of said pull rod and tensioning of said flexible elements raises the associated conduit.

11. In a battery of cages as in claim 9, said conduits being of a noncircular transverse cross section closely received within said guide means whereby the cross-sectional configuration of said conduits maintains a predetermined orientation of said conduits to said guide means and columns during movement of said conduit between its operative positions.

* * * * *